United States Patent [19]

Parsons

[11] Patent Number: 5,013,288

[45] Date of Patent: May 7, 1991

[54] TRANSMISSION SYSTEMS

[75] Inventor: Bryan N. V. Parsons, Stoney Stanton, United Kingdom

[73] Assignee: Jaguar Cars Limited, United Kingdom

[21] Appl. No.: 464,985

[22] Filed: Jan. 16, 1990

[30] Foreign Application Priority Data

Jan. 21, 1989 [GB] United Kingdom ................ 8901322

[51] Int. Cl.[5] .......................................... F16H 1/32
[52] U.S. Cl. .................... 475/166; 475/114; 475/170; 74/199
[58] Field of Search ............... 475/114, 115, 165, 166, 475/170, 171, 214, 215, 216; 74/199, 190, 63

[56] References Cited

U.S. PATENT DOCUMENTS

| | | | |
|---|---|---|---|
| 2,583,496 | 1/1952 | Rougelot | 74/199 |
| 2,595,439 | 5/1952 | Arato | 74/199 |
| 2,837,937 | 6/1958 | Kraus | 475/166 |
| 2,849,885 | 9/1958 | Beier | 74/199 |
| 3,020,782 | 2/1962 | Sacchi | 74/190 |
| 3,082,634 | 3/1963 | Battistin | 74/199 |
| 3,151,717 | 10/1964 | Kaptur et al. | 192/3.2 |
| 3,190,148 | 6/1965 | Flichy | 475/166 |
| 3,202,003 | 8/1965 | Heintz | 74/199 |
| 3,530,732 | 9/1970 | Kashihara | 74/199 |
| 3,765,257 | 10/1973 | Ogino | 74/199 |
| 4,505,163 | 3/1985 | Falkner . | |
| 4,924,730 | 5/1990 | Parsons | 475/166 |

FOREIGN PATENT DOCUMENTS

WO80/02729 12/1980 PCT Int'l Appl. .
WO81/03367 11/1981 PCT Int'l Appl. .

Primary Examiner—Dwight Diehl
Assistant Examiner—Matthew Stavish
Attorney, Agent, or Firm—Davis, Bujold & Streck

[57] ABSTRACT

A continuously variable transmission system includes an input assembly having a first member connected to an input shaft, the first member being of cylindrical formation and having a pair of axially separated inwardly directed flange formations. The opposed faces of flange formations are conical and are inclined inwardly away from one another. A second member is mounted in fixed rotational relationship but movable axially of the first member. The second member has an inwardly directed flange formation with oppositely inclined conical faces. The first and second members thereby define a pair of inwardly directed annular grooves the walls of which diverge inwardly. First and second annular discs are mounted for rotation about axes parallel to but eccentric of the axis of rotation of the input assembly, so that each disc engages in a different one of the grooves. Each disc engages the opposed conical walls of its associated groove so that drive is transmitted from the input assembly to each of the discs. The axes of rotation of discs are movable so that the radial position of engagement of each disc with the walls of the associated groove may be varied, one disc moving into the groove while the other disc moves out of groove and vice versa, so that both discs are maintained in driving engagement with the walls while the drive ratio therebetween is varied. The first disc is drivingly connected to one element, the second disc to a second element and an output is taken from the third element of an epicyclic gear train.

20 Claims, 4 Drawing Sheets

TRANSMISSION SYSTEMS

BACKGROUND TO THE INVENTION

The present invention relates to transmission systems and in particular to continuously variable transmission systems.

SUMMARY OF THE INVENTION

According to one aspect of the present invention a continuously variable transmission system comprises an input assembly having a first member adapted to be connected to an input shaft, said first member having a pair of annular formations in fixed axially spaced and rotational relationship, the opposed faces of the annular formations being conical and of opposite inclination, a second member mounted on the first member so that it is fixed rotationally but movable axially relative thereto, said second member defining an annular formation with oppositely inclined conical faces and being mounted intermediate of the annular formations of the first member, so that the conical faces of the annular formations of the first member and the conical faces of the annular formation of the second member define a pair of circumferential grooves, the walls of each groove being defined by an oppositely inclined pair of the conical faces, first and second annular discs are mounted for rotation about axes parallel to but eccentric of the axis of rotation of the input assembly, so that each disc engages in a different one of the grooves defined by the input assembly, each disc engaging the opposed conical faces defining the walls of its associated groove so that drive is transmitted from the input assembly to each of the discs, means being provided for movement of the axis of rotation of each of the discs so that the radial position of engagement of each disc with the conical faces defining the walls of its associated groove may be varied, one disc moving into its associated groove while the other disc moves out of its associated groove and vice versa, so that both the discs are maintained in driving engagement with the conical faces defining the walls of their associated grooves, the first disc being drivingly connected to one element of an epicyclic gear train, the second disc being drivingly connected to a second element of the epicyclic gear train and an output being taken from the third element of the epicyclic gear train.

With the transmission system described above, variation of the radial position of engagement of each disc with the conical faces defining the walls of its associated groove, will vary the drive ratio between the input assembly and the disc. As one disc is moved inwardly as the other is moved outwardly, the drive ratio of one disc and the associated element of the epicyclic gear train will decrease as the drive ratio of the other disc and the associated element of the epicyclic gear train will increase. As a consequence, the overall drive ratio of the transmission system will vary depending upon which elements of the epicyclic gear train are associated with each of the discs.

In one preferred embodiment, gear teeth are provided on the inner periphery of each of the discs, these teeth engaging external gears connected by concentric shafts to the associated elements of the epicyclic gear train. The discs are mounted for rotation about axes which are eccentric of the axis of the epicyclic gear train, which in turn is eccentric of the input assembly, means being provided for rotation of the axes of rotation of the discs about the axis of the epicyclic gear train, to move the disc eccentrically of the input assembly while maintaining the gear teeth of the discs in engagement with the gears connected to the associated elements of the epicyclic gear train.

Preferably, the input assembly and discs are arranged such that when the overall drive ratio is 1:0 the discs engage the conical faces defining the walls of the associated grooves over areas that coincide angularly and radially relative to the axis of rotation of the input assembly so that the forces exerted are bridged linearly across the first and second members of the input assembly.

In the above system, drive is transmitted by engagement of the conical faces defining the walls of the grooves by the discs. Means may consequently be provided to bias the discs inwardly of the grooves to maintain an adequate frictional force therebetween. This means preferably varies the load applied between the discs and associated grooves as a function of the torque output demand. Alternatively, means may be provided to transmit drive positively between the conical faces and the associated discs..

BRIEF DESCRIPTION OF THE DRAWINGS

Several embodiments of the invention are now described, by way of example only, with reference to the accompanying drawings, in which.

DESCRIPTION OF A PREFERRED EMBODIMENT

Figure 1:
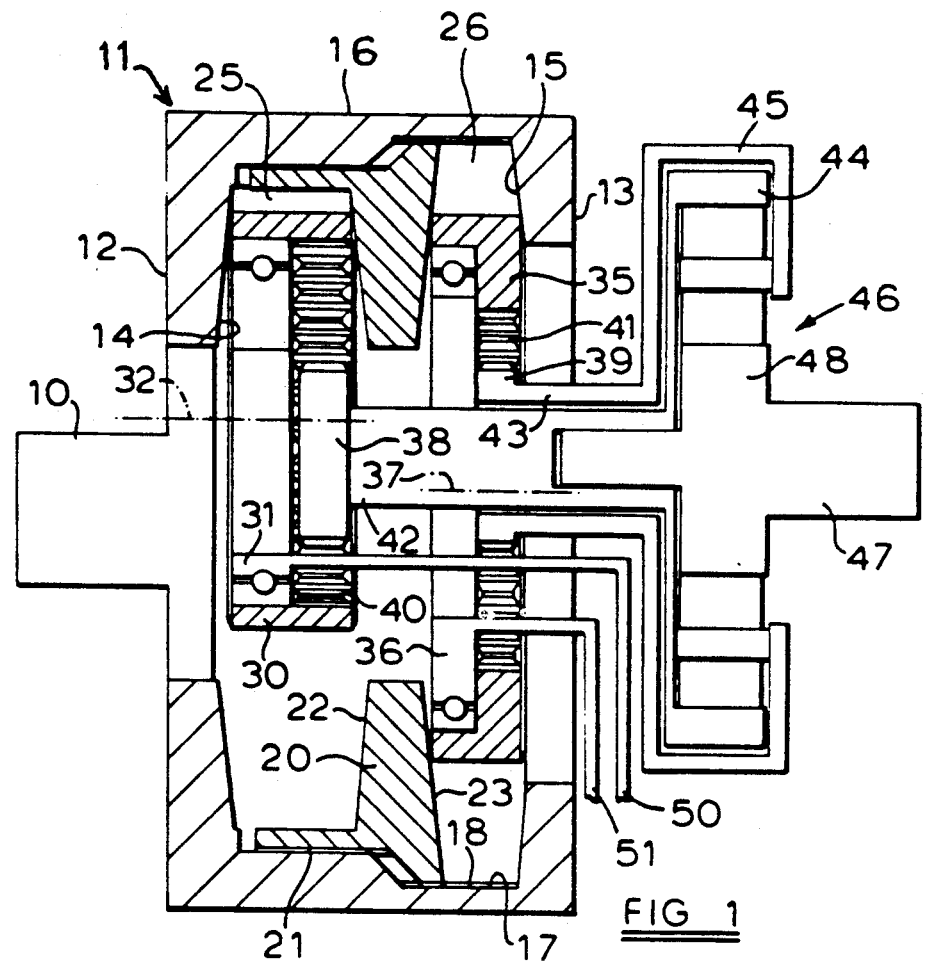
FIG. 1 is a sectional elevation illustrating a transmission system in accordance with the present invention.

As illustrated in FIG. 1, a transmission system comprises an input shaft 10 with a cylindrical element 11 mounted on the end thereof for rotation therewith. The cylindrical element 11 has a pair of inwardly directed flange formations 12, 13 one at each end. The inner faces 14, 15 of the flange formations 12, 13 are conical, diverging away from the body portion 16 of the cylindrical element 11.

The internal surface 17 of body portion 16 has splines 18. An annular member 20 with corresponding splines 21 on its outer diameter is slidingly mounted on the body portion 16, the splines 18 on the body portion 16 engaging the splines 21 on the annular member 20, so that rotation of the cylindrical member 11 is transmitted to the annular member 20. The annular member 20 has conical faces 22, 23 which converge away from the body portion 16 of the cylindrical element 11, so that the cylindrical element 11 and annular member 20 define a pair of inwardly opening circumferential grooves 25, 26 the walls of which are defined by the divergent conical faces 14, 22 and 15, 23 respectively.

A first annular disc 30 is mounted for rotation on bearing 31 about axis 32, so that the outer periphery of the disc 30 extends, at one side, into groove 25 and engages the conical faces 14, 22 thereof. Rotation of the input shaft 10 will thus be transmitted to the disc 30, the drive ratio depending on the radius at which the disc 30 engages the conical faces 14 and 22. Similarly, an annular disc 35 of significantly larger diameter than disc 30 is mounted for rotation on bearing 36 about axis 37, so that the outer periphery of the disc 35 extends, at one side, into the groove 26 and engages the conical faces 15 and 23 thereof. Rotation of the input shaft 10 will similarly be transmitted to the disc 35, the drive ratio depending on the radius at which disc 35 engages the conical faces 13 and 23.

The annular discs 30 and 35 have gear teeth 40, 41 around their inner peripheries, said teeth 40, 41 meshing with teeth on external gears 38 and 39 which are connected by concentric shafts 42 and 43 to the annulus 44 and the planet gear carrier 45 respectively, of an epicyclic gear train 46. An output shaft 47 is connected to the sun gear 48.

Means 50, 51 associated with bearings 31, 36 are provided by means of which the axes of rotation 32, 37 of discs 30, 35 respectively, may be rotated independently about the axis of rotation of the epicyclic gear train 46. Movement of the axes of rotation 32 and 37 in this manner will move the discs 30 and 35 radially inwardly and outwardly of the grooves 25 and 26, so that the radii at which the discs 30 and 35 engage the conical faces 14, 22 and 15, 23 of the grooves 25 and 26 will vary, thus varying the drive ratio between the input shaft 10 and each of the discs 30 and 35. The means 50, 51 are controlled so that as one disc 30 moves outwardly, the other disc 35 moves inwardly and vice versa, in order to maintain a frictional load between the discs 30, 35 and the conical faces 14, 22 and 15, 23, sufficient to maintain traction therebetween, the annular member 20 moving axially of the cylindrical member 11 to accommodate radial movement of the discs 30 and 35.

The frictional load between discs 30 and 35 and the conical faces 14, 22 and 15, 23 is preferably varied as a function of the torque output demand of the transmission system, so that at low ratios when torque output demand is high the frictional load is high and at high ratios when torque output demand is low the frictional load is low.

Figure 8:
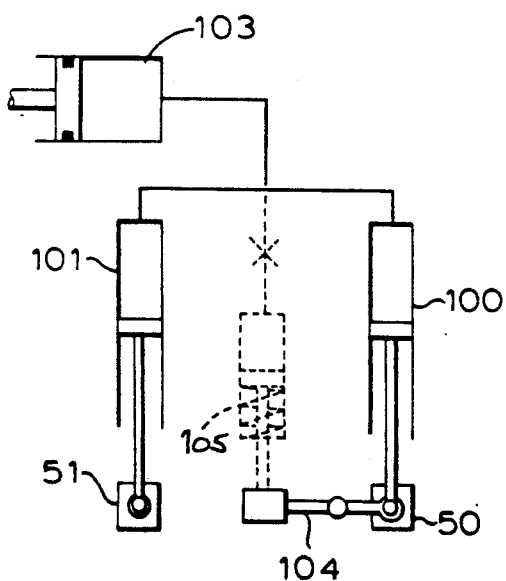
FIG. 8 illustrates a control system for the transmission system illustrated in FIG. 1.

FIG. 8 illustrates one method of controlling the position and loading of the discs 30 and 35. As illustrated a pair of rams 100 and 101 act on means 50 and 51 respectively, to rotate the inner eccentric races of bearing 31 and 36 about the axis of rotation of the epicyclic gear train 46. The rams 100 and 101 are connected to a master cylinder 103 which is controlled by torque sensing means associated with the output shaft 47. A lever mechanism 104 also acts on means 50, so that movement of lever 104 will rotate the inner race of bearing 31 about the axis of rotation of epicyclic gear train 47. The lever mechanism 104 may be controlled automatically in response to torque output demand. This may be done through the master cylinder 103 via suitable proportioning means 105 or by independent means, which will produce a displacement of lever 104 proportional to the torque output demand. With automatic control, manually controlled means may be included to control the direction of movement, so that forward or reverse ratios may be selected as required.

With this control arrangement, equal loads will be applied by rams 100 and 101 to the discs 30 and 35, these loads being balanced across the annular member 20. The magnitude of the load is controlled by the master cylinder 103 in proportion to the torque output demand. To change the ratio of the transmission, lever 104 moves disc 30 radially inwardly or outwardly. Inward movement of disc 30 permits movement of annular member 20 to the left as illustrated, so that disc 35 will move outwardly until the loads applied by rams 100 and 101 are again equal. Similarly outward movement of disc 30 will move annular member 20 to the right causing disc 35 to move inwardly until the loads are again equal.

Figure 9:
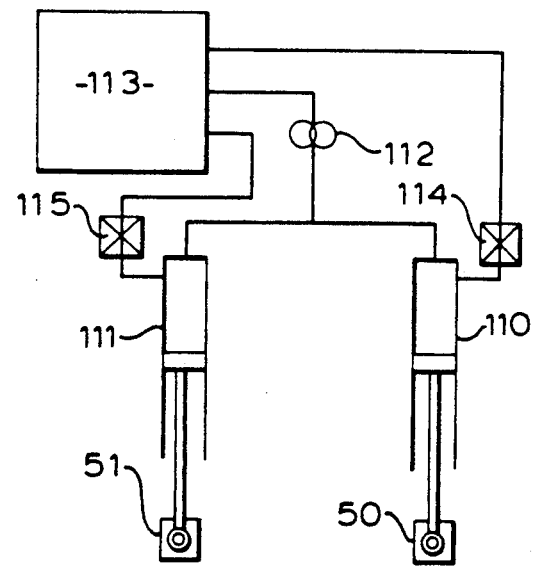
FIG. 9 illustrates an alternative form of control system.

In an alternative control system illustrated in FIG. 9, a pair of rams 110 and 111 are connected via pump 112 to a hydraulic fluid reservoir 113. The rams 110 and 111 are connected back to the reservoir 113 via variable throttle control means 114 and 115. The rams 110 and 111 act on means 50 and 51 respectively, in similar manner to the embodiment illustrated in FIG. 8.

In operation, hydraulic fluid is supplied continually to rams 110 and 111 by pump 112 and is returned to the reservoir 113 via throttle control means 114 and 115. The throttle control means 114 and 115 are controlled by, for example, torque sensing means associated with the output shaft 47, so as to reduce flow from rams 110 and 111 when high torque output is required and to increase flow from rams 110 and 111 when low torque output is required. In this manner the frictional load on discs 30 and 35 is increased when the torque output demand is high and decreased when the torque output demand is low. The discs 30 and 35 are moved radially relative to one another by controlling the throttle control means 114 and 115 so that flow from one of the rams 110, 111 is increased while flow from the other ram 111, 110 is decreased. The differential in rates of flow from rams 110 and 111 will be maintained until the required ratio is obtained when the rates of flow will be equalized to provide the resired frictional load.

While in the above embodiments external control means are described, the means for loading and moving the discs 30 and 35, for example hydraulic rams, may be located internally of the discs 30 and 35.

The radii of discs 30 and 35, drive ratios between disc 30 and planet carrier 45 and between disc 35 and annulus 44 and the ratio of the annulus 44 to sun gear 48 are selected such that the discs 30 and 35 will engage the conical faces 14, 22 and 15, 23 of grooves 25 and 26 over areas which coincide angularly and radially relative to the axis of input shaft 10, when the overall drive ratio of the transmission is 1:0. In this manner at low ratios when torque output demand is normally high, the relatively high loads applied between discs 30 and 35 and the input assembly 11/20 will be bridged directly across the cylindrical member 11 by the aligned discs 30 and 35 and the intermediate annular member 20.

If:

$r_1$ = radius of disc 30;
$r_2$ = radius of disc 35;
$Eo_1$ = eccentricity of disc 30 from axis of input shaft 10, for zero output;
$Eo_2$ = eccentricity of disc 35 from axis of input shaft 10, for zero output;
$a$ = drive ratio from disc 30 to annulus 44;
$b$ = drive ratio from disc 35 to planet carrier 45;

G = ratio of epicyclic annulus 44 to sun gear 47;
e = half radial separation between points of contact of discs 30 and 35 with grooves 25 and 26 respectively, (—ve valves indicating disc 30 outside disc 35);
$W_{in}$ = speed of shaft 10;
$W_1$ = speed of annulus 44;
$W_2$ = speed of planet carrier 45;
$W_{out}$ = speed of sun gear 48 and output shaft 47.

For the Epicyclic Gear Train:

$$W_{out} = W_2(G+1) - W_1 G \quad (1).$$

For disc 30:

$$\text{rotational speed} = W_{in}(r_1 E o_1 - e)/r_1$$

$$\text{therefore annulus speed} = W_1 = W_{in}a(r_1 + Eo_1 - e)/r_1$$

For disc 35:

$$\text{rotational speed} = W_{in}(r_2 + Eo_2 + e)/r_2$$

$$\text{therefore planet carrier speed} = W_2 = W_{in}b(r_2 + Eo_2 + e)/r_2$$

When output = 0

$$e = 0 \text{ and } r_2 + Eo_2 = r_1 + Eo_1$$

Substituting in equation (1)

$$W_{out} = 0 = (r_2 + Eo_2)W_{in}b(G+1)/r_2 - (r_1 + Eo_1)W_{in}aG/r_1$$

So that $$b(G+1)/r_2 = aG/r_1 \quad (3)$$

and $$G = 1/(ar_2/br_1 - 1) \quad (4)$$

In general:

$$W_{out}/W_{in} = b(r_2 + Eo_2 + e)(G+1)/r_2 - aG(r_1 + Eo_1 - e)/r_1$$

$$= b(r_2 + Eo_2)(G+1)/r_2 - aG(r_1 + Eo_1)/r_1 + e[b(G+1)/r_2 + Ga/r_1]$$

From equations (2) and (3)

$$W_{out}/W_{in} = e2Ga/r_1 \quad (5)$$

For conditions when epicyclic gear train is locked, $$W_1 = W_2 = W_{out}$$

therefore (speed of disc 30) × a = (speed of disc 35) × b so that $$(r_1 + Eo_1 - e)a/r_1 = (r_2 + Eo_2 + e)b/r_2$$

If $$n = r_1 + Eo_1 = r_2 + Eo_2$$

then $$(n - e)a/r_1 = (n + e)b/r_2$$

so that $$(1 + ar_2/br_1)e = (ar_2/br_2 - 1)n$$

From equation (4):

$$ar_2/br_1 = 1/G + 1$$

so that, at lockout:

$$e = n/(1 + 2G) \quad (6)$$

In a typical example:

The drive ratios a and b are equal = 2.08
radius of disc 30 = 56 mm
radius of disc 35 = 84 mm
for zero output $r_1 + Eo_1 = r_2 + Eo_2$ = 90 mm From equation (4)

$$G = 2$$

and from equation (6) at lockout $$e = 30 \text{ mm}$$

From equation (5)

| e | $W_{out}/W_{in}$ |
|---|---|
| −2.5 | −0.37 |
| 0 | 0 |
| 2.5 | 0.37 |
| 5 | 0.74 |
| 10 | 1.49 |
| 15 | 2.23 |
| 20 | 2.97 |
| 25 | 3.71 |
| 30 | 4.46 |

As illustrated by the above example, by variation of the axes of rotation of discs 30 and 35 by means 50 and 51 respectively, the illustrated transmission system can give both forward and reverse drive ratios.

Figure 3:
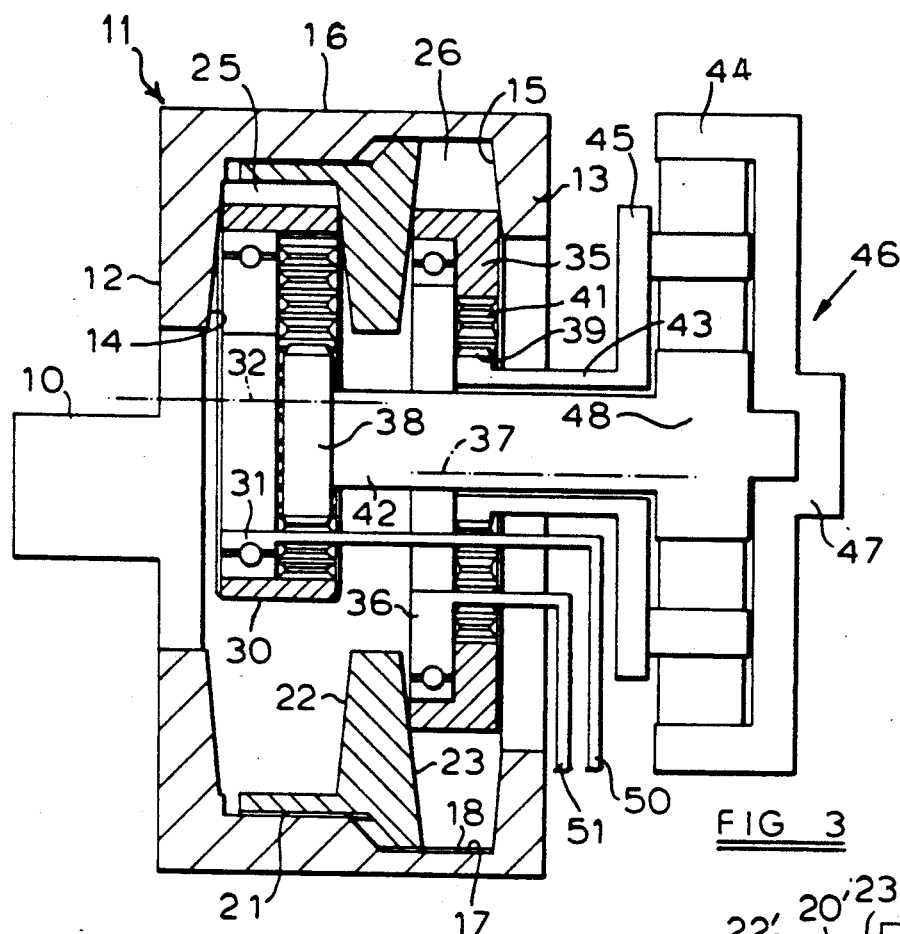
FIG. 3 illustrates a modification to the system illustrated in FIG. 1.

In the embodiment illustrated in FIG. 3, disc 30 is drivingly connected to the sun gear 48, disc 35 is drivingly connected to the planet carrier 45 and the output shaft 47 is connected to the annulus 44.

With this embodiment:

$$W_{out} = [W_2(G+1) - W_3]/G \quad (1a)$$

Where $W_3$ = speed of sun gear 48 sun gear speed = $W_3 = W_{in}a(r_1 + Eo_1 - e)/r_1$ planet carrier speed = $W_2 = W_{in}b(r_2 + Eo_2 + e)b/r_2$ When $$e = 0:$$

$$r_2 + Eo_2 = r_1 + Eo_1$$

Thus:

$$W_{out}=0=W_{in}[b(r_2+E_{o2})(G+1)/r_2-a(r_2+E_{o2})/r_1]/G \quad (2a)$$

$$b(G+1)/r_2=a/r_1 \quad (3a)$$

$$G=ar_2/br_1-1 \quad (4a)$$

In general:

$$W_{out}/W_{in} = b(r_2 + E_{o2} + e)(G + 1)/r_2 -$$
$$a(r_1 + E_{o1} - e)/r_1$$
$$= b(r_2 + E_{o2})(G + 1)/r_2 - a(r_1 + E_{o1})/r_1 +$$
$$e[b(G + 1)/r_2 + a/r_1]$$

From equations (2a) and (3a)

$$W_{out}/W_{in}=2ea/r_1 \quad (5a)$$

Figure 2:
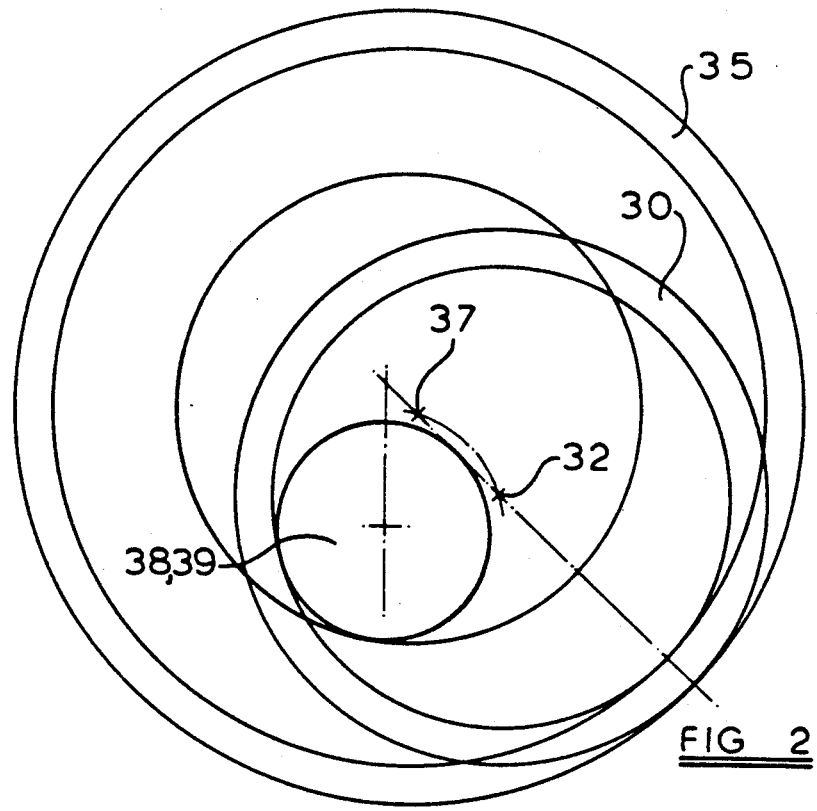
FIG. 2 illustrates in elevation, the relative positions of the elements of the system shown in FIG. 1.

As with the embodiment illustrated in FIGS. 1 and 2 when the epicyclic gear train is locked $$(1+ar_2/br_1)e=(ar_2/br_1-1)n$$

From equation (4a)

$$ar_2/br_1=G+1$$

So that at lock out $$e=Gn/(G+2) \quad (6a)$$

Using the dimensions of the above example

| From equation (4a) | G = 0.5 |
| From equation (6a) at lockout | e = 18 |
| From equation (5a) | |
| e | $W_{out}/W_{in}$ |
| --- | --- |
| −2.5 | −0.19 |
| 0 | 0 |
| 2.5 | 0.19 |
| 5 | 0.37 |
| 10 | 0.74 |
| 15 | 1.11 |
| 20 | 1.49 |
| 25 | 1.86 |
| 30 | 2.23 |

As with the embodiment illustrated in FIGS. 1 and 2, movement of the axes of rotation 32 and 37 of discs 30 and 35 relative to the axis of rotation of the epicyclic gear train 46 will provide reverse and forward drive ratios.

Figure 4:
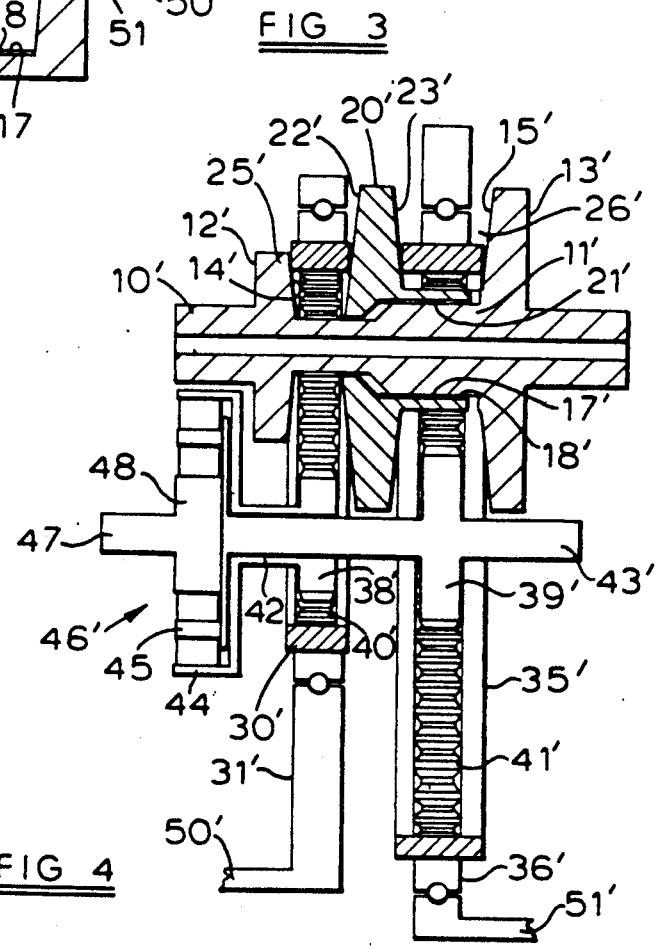
FIG. 4 is a sectional elevation illustrating an alternative form of transmission system in accordance with the present invention.

In the embodiment illustrated in FIG. 4, outwardly directed flanges 12' and 13' are provided on cylindrical member 11'. The annular member 20' is slidingly mounted on the external diameter of cylindrical member 11' intermediate of flanges 12' and 13', to define two outwardly opening circumferential grooves 25' and 26'. As with the previous embodiments, each of the grooves 25', 26' is defined by the conical faces 14', 22' and 15', 23' respectively. Inter-engaging splines 18' and 21' on the cylindrical member 11' and annular member 20' prevent relative rotation therebetween.

Annular discs 30' and 35' are mounted in similar manner to the previous embodiments, so that they engage in grooves 25' and 26' and may be moved radially inwardly and outwardly relative to said grooves 25' and 26'. The discs 30' and 35' are connected to the annulus 44' and planet carrier 45' of epicyclic gear 46' through gears 38' and 39' as in the embodiment illustrated in FIG. 3. As with the previous embodiments, movement of the discs 30' and 35' within the grooves 25' and 26' will provide both forward and reverse drive ratios.

Figure 5:
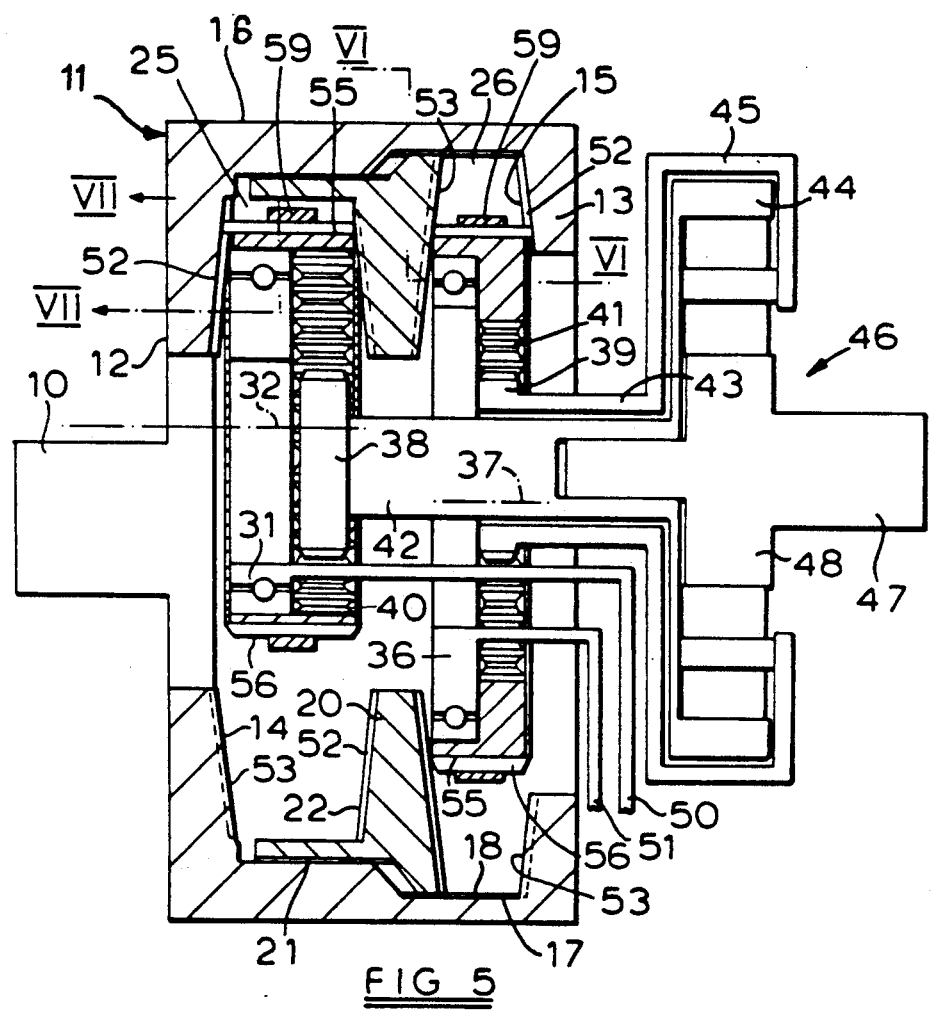
FIG. 5 illustrates a further modification to the embodiment illustrated in FIG. 1.
Figure 6:
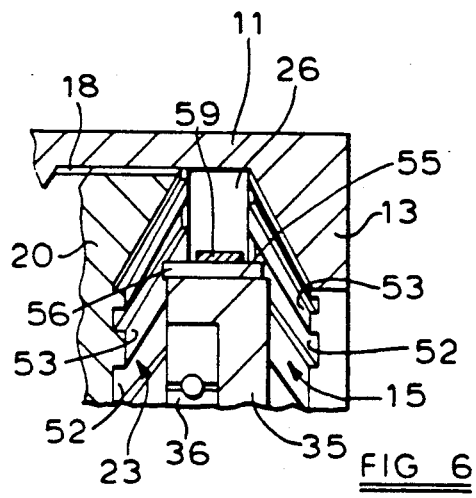
FIG. 6 is a section along the line VI—VI of FIG. 5.
Figure 7:
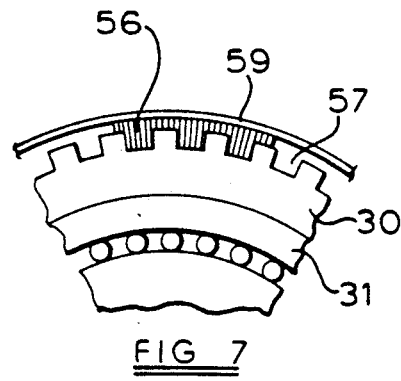
FIG. 7 is a section along the line VII—VII of FIG. 5.

In the modification illustrated in FIGS. 5 and 6 the opposed conical faces 14 and 22 and 15 and 23 defined by a cylindrical member 11 and annular member 20 are provided with angularly spaced radial grooves 52, the grooves 52 on one face 14, 15 of each pair of opposed faces being aligned with the lands 53 between grooves 52 on the other face 22, 23 of each pair of opposed faces. As illustrated in FIG. 7, the outward periphery 55 of each of the annular discs 30 and 35 are made up of a series of slats 56 which are arranged parallel to one another longitudinally of the annular discs 30, 35. The outer peripheries of discs 30, 35 are provided with angularly spaced longitudinal grooves 57 and alternative groups of slats 56 engage in the grooves 57, so that the slats 55 are located angularly of the discs 30, 35. The slats 55 are however free to slide longitudinally of the discs 30, 35 and of one another. A ring 59 is provided about the outer periphery of the slats 55 in order to retain the slats 55 radially of the discs 30, 35.

With this embodiment, where the discs 30, 35 engage the conical faces 14, 22 and 15, 23 of grooves 25 and 26 respectively, the lands 53 on one face 14, 15 will push the slats 55 into the radial grooves 52 on the other face 22, 23 and vice versa, so that rotary motion of the cylindrical member 11 and annular member 20 will be transmitted positively to the discs 30 and 35.

I claim:

1. A continuously variable transmission system comprising an input assembly having a first member adapted to be connected to an input shaft, said first member having a pair of annular formations in fixed axially spaced and rotational relationship, the opposed faces of the annular formations being conical and of opposite inclination, a second member mounted on the first member so that it is fixed rotationally but movable axially relative thereto, said second member defining an annular formation with oppositely inclined conical faces and being mounted intermediate of the annular formations of the first member, so that the conical faces of the annular formations of the first member and the conical faces of the annular formation of the second member define a pair of circumferential grooves, the walls of each groove being defined by an oppositely inclined pair of the conical faces, first and second annular discs are mounted for rotation about axes parallel to but eccentric of the axis of rotation of the input assembly, so that each disc engages in a different one of the grooves defined by the input assembly, each disc engaging the opposed conical faces defining the walls of its associated groove so that drive is transmitted from the input assembly to each of the discs, means being provided for movement of the axis of rotation of each of the discs so that the radial position of engagement of each disc with the conical faces defining the walls of its associated groove may be varied, one disc moving into its associated groove while the other disc moves out of its associated groove and vice versa, so that both the discs are maintained in driving engagement with the conical faces defining the walls of their associated grooves, the first disc being drivingly connected to one element of an epicyclic gear train, the second disc being drivingly connected to a second element of the epicyclic gear train and an output being taken from the third element of the epicyclic gear train.

2. A continuously variable transmission system according to claim 1 in which when the overall drive ratio is 1:0, the discs engage the conical faces defining the walls of the associated grooves over areas that coincide or substantially coincide angularly and radially relative to the axis of rotation of the input assembly.

3. A continuously variable transmission system according to claim 1 in which the input assembly comprises a first cylindrical member drivingly connected to the input shaft, said cylindrical member defining two axially spaced radially extending flange formations, the inner faces of the flange formations being conical and diverging away from the intermediate portion of the cylindrical element, an annular member being slidably located on the cylindrical element intermediate of the flange formations, the faces of the annular element being conical and converging away from the abuting portion of the cylindrical element so as to define a pair of circumferential grooves each groove being defined by a pair of oppositely inclined conical faces.

4. A continuously variable transmission system according to claim 3 in which the grooves are formed on the inner periphery of the cylindrical element.

5. A continuously variable transmission system according to claim 3 in which the grooves are formed on the outer periphery of the cylindrical element.

6. A continuously variable transmission system according to claim 3 in which the annular member is slidably mounted on the cylindrical element by means of splines which permit axial movement but prevent relative rotation.

7. A continuously variable transmission system according to claim 1 in which the discs are mounted for rotation about axes eccentric of the axis of the epicyclic gear train, the axis of the epicyclic gear train being eccentric of the axis of the input assembly.

8. A continuously variable transmission system according to claim 7 in which means is provided for moving the axis of rotation of the discs concentrically of the axis of the epicyclic gear train, thereby moving the discs in to or out of the grooves.

9. A continuously variable transmission system according to claim 1 in which gear teeth are provided on the inner periphery of the discs, said gear teeth meshing with gears drivingly connected to the associated elements of the epicyclic gear train.

10. A continuously variable transmission system according to claim 9 in which the gears are connected to the elements of the epicyclic gear train by coaxial shafts.

11. A continuously variable transmission system according to claim 1 in which the first disc is drivingly connected to the annulus of the epicyclic gear train, the second disc is drivingly connected to the planet carrier of the epicyclic gear train and an output shaft is connected to the sun gear of the epicyclic gear train.

12. A continuously variable transmission system according to claim 11 in which the first disc is of significantly smaller diameter than the second disc.

13. A continuously variable transmission system according to claim 1 in which the first disc is drivingly connected to the sun gear of the eipcyclic gear train, the second disc is connected to the planet carrier of the epicyclic gear train and an output shaft is connected to the annulus of the epicyclic gear train.

14. A continuously variable transmission system according to claim 1 in which means is provided to apply a load to the discs urging them into engagement with the conical faces defining the associated groove in order to provide frictional engagement therebetween.

15. A continuously variable transmission system according to claim 14 in which the load applied to the discs is a function of the torque output requirement, the load increasing as the torque output requirement increases.

16. A continuously variable transmission system accrding to claim 14 in which a hydraulic or hydraulic/mechanical system controls the radial movement and loading of the discs.

17. A continuously variable transmission system according to claim 1 in which means is provided for positively transmitting drive between the conical faces defining the grooves and the associated discs.

18. A continuously variable transmission system according to claim 17 in which radial grooves are provided on the conical faces defining the grooves and the periphery of the disc engaging the conical faces is defined by a series of slats which are fixed angularly of the disc but are free to move relative to the disc and to one another parallel to the axis of rotation of the disc, so that at the point of contact with the conical faces, the slats will engage in the radial grooves to positively transmit drive therebetween.

19. A continuously variable transmission system according to claim 18 in which the radial groove in one conical face of each pair of conical faces are opposed to the lands between radial grooves in the other conical face, so that where the slats on the disc engage the conical faces, the lands on one conical face will shift the slats laterally into engagement with the radial grooves on the other conical face and vice versa.

20. A continuously variable transmission system according to claim 18 in which lateral grooves are provided on the periphery of the disc, alternate groups and slats being located in the lateral grooves with intermediate groups of slats being located between those groups located in the lateral grooves, so that the slats are located angularly of the disc.

* * * * *